United States Patent
Bolsoy et al.

(10) Patent No.: US 9,567,170 B2
(45) Date of Patent: Feb. 14, 2017

(54) SYSTEM FOR TURNING A CARGO CARRIER AS WELL AS A TRANSPORT DEVICE PROVIDED WITH A LOOSE CARGO CARRIER

(75) Inventors: Bengt Bolsoy, Kiruna (SE); Fredrik Kangas, Kiruna (SE); Daniel Kangas, Kiruna (SE)

(73) Assignee: Kiruna Wagon AB, Kiruna (SE)

( * ) Notice: Subject to any disclaimer, the term of this patent is extended or adjusted under 35 U.S.C. 154(b) by 434 days.

(21) Appl. No.: 13/806,379

(22) PCT Filed: Jun. 29, 2011

(86) PCT No.: PCT/SE2011/000125
§ 371 (c)(1),
(2), (4) Date: Mar. 7, 2013

(87) PCT Pub. No.: WO2012/002873
PCT Pub. Date: Jan. 5, 2012

(65) Prior Publication Data
US 2013/0189058 A1 Jul. 25, 2013

(30) Foreign Application Priority Data
Jun. 30, 2010 (SE) ...................................... 1050718

(51) Int. Cl.
*B65G 67/42* (2006.01)
*B61D 9/06* (2006.01)
(Continued)

(52) U.S. Cl.
CPC ................. *B65G 67/42* (2013.01); *B61D 9/06* (2013.01); *B61D 9/08* (2013.01); *B61D 9/14* (2013.01)

(58) Field of Classification Search
CPC ............... B61D 9/06; B61D 9/08; B61D 9/14; B61D 9/02; B61D 9/04; B61D 9/10; B65G 67/42; B65G 67/32
(Continued)

(56) References Cited

U.S. PATENT DOCUMENTS 1,433,009 A * 10/1922 Hildebrandt ............. B61D 9/02
105/264
1,688,657 A 10/1928 Repper
(Continued)

FOREIGN PATENT DOCUMENTS

BR    MU8603013 U    4/2008
DE    335351 C    3/1921
(Continued)

OTHER PUBLICATIONS

Australian Patent Examination Report No. 1 dated Jan. 31, 2014 for AU Patent Application No. 2011271709 filed Jun. 30, 2010; pp. 1-3.
(Continued)

*Primary Examiner* — Glenn Myers
(74) *Attorney, Agent, or Firm* — Dinsmore & Shohl LLP

(57) ABSTRACT

The invention relates to a system for turning a cargo carrier (3) with the purpose of discharging the same of cargo, which system comprises a transport device (1) having a chassis, a cargo carrier (3) loosely carried on the chassis and provided with engagement points (6a, 6b), a first turning device (10) disposed to engage with the engagement points (6a) of the cargo carrier as well as to actuate the cargo carrier for the turning of the same, and a second turning device (11) disposed to engage with the engagement points (6b) of the cargo carrier at the same time as the first turning device actuates the cargo carrier, members for the control and actuation of at least the first device (10), and members for the correct positioning of the cargo carrier (3). Upon actua-
(Continued)

tion of the first device (10), the cargo carrier is disposed to tilt so that the engagement points arranged on the second side of the cargo carrier will engage with the second turning device (11). The invention also relates to a transport device and the use of such a transport device in the system.

12 Claims, 11 Drawing Sheets

(51) Int. Cl.
    *B61D 9/08*     (2006.01)
    *B61D 9/14*     (2006.01)

(58) Field of Classification Search
    USPC .................................. 414/425, 359, 360, 576
    See application file for complete search history.

(56) References Cited

U.S. PATENT DOCUMENTS

| | | | |
|---|---|---|---|
| 1,940,732 A * | 12/1933 | Schmohl | B61D 9/14 |
| | | | 414/386 |
| 1,959,976 A | 5/1934 | Anderson et al. | |
| 1,977,819 A * | 10/1934 | Burner | B61D 9/02 |
| | | | 105/273 |
| 2,393,695 A * | 1/1946 | Kling | 414/592 |
| 2,663,438 A | 12/1953 | McCune | |
| 2,760,657 A * | 8/1956 | Flowers | B61D 9/14 |
| | | | 414/386 |
| 2,936,085 A * | 5/1960 | Schnaitter et al. | 414/386 |
| 3,176,860 A * | 4/1965 | Franklin | B61D 9/08 |
| | | | 414/386 |
| 4,389,149 A * | 6/1983 | Dancs | B65G 67/42 |
| | | | 414/382 |
| 4,432,688 A * | 2/1984 | Schmidt | B65G 67/42 |
| | | | 414/358 |
| 4,505,631 A * | 3/1985 | Warner et al. | 414/359 |
| 4,573,850 A * | 3/1986 | Suarez | B65G 67/42 |
| | | | 414/382 |
| 4,597,337 A | 7/1986 | Willetts | |
| 4,685,851 A * | 8/1987 | Dowden | 414/361 |
| 5,367,958 A | 11/1994 | Weiss et al. | |
| 5,813,353 A | 9/1998 | Sauter | |
| 6,835,041 B1 * | 12/2004 | Albert | B61D 9/02 |
| | | | 105/241.2 |
| 2012/0051875 A1 * | 3/2012 | Teichrob et al. | 414/359 |

FOREIGN PATENT DOCUMENTS

| | | |
|---|---|---|
| DE | 379083 C | 8/1923 |
| DE | 1151219 B | 7/1963 |
| FR | 1180990 A | 6/1959 |
| GB | 2227480 A | 8/1990 |
| WO | 2009062317 A1 | 5/2009 |

OTHER PUBLICATIONS

International Search Report relating to PCT/SE2011/000125 filed Jun. 29, 2011; Mail Date: Oct. 24, 2011.
International Preliminary Report on Patentability relating to PCT/SE2011/000125 filed Jun. 29, 2011; Completion of report: Aug. 31, 2012.
Reply to "Written Opinion of the International Preliminary Examining Authority" filed on Jul. 5, 2012, relating to PCT/SE2011/000125 filed Jun. 29, 2011.

* cited by examiner

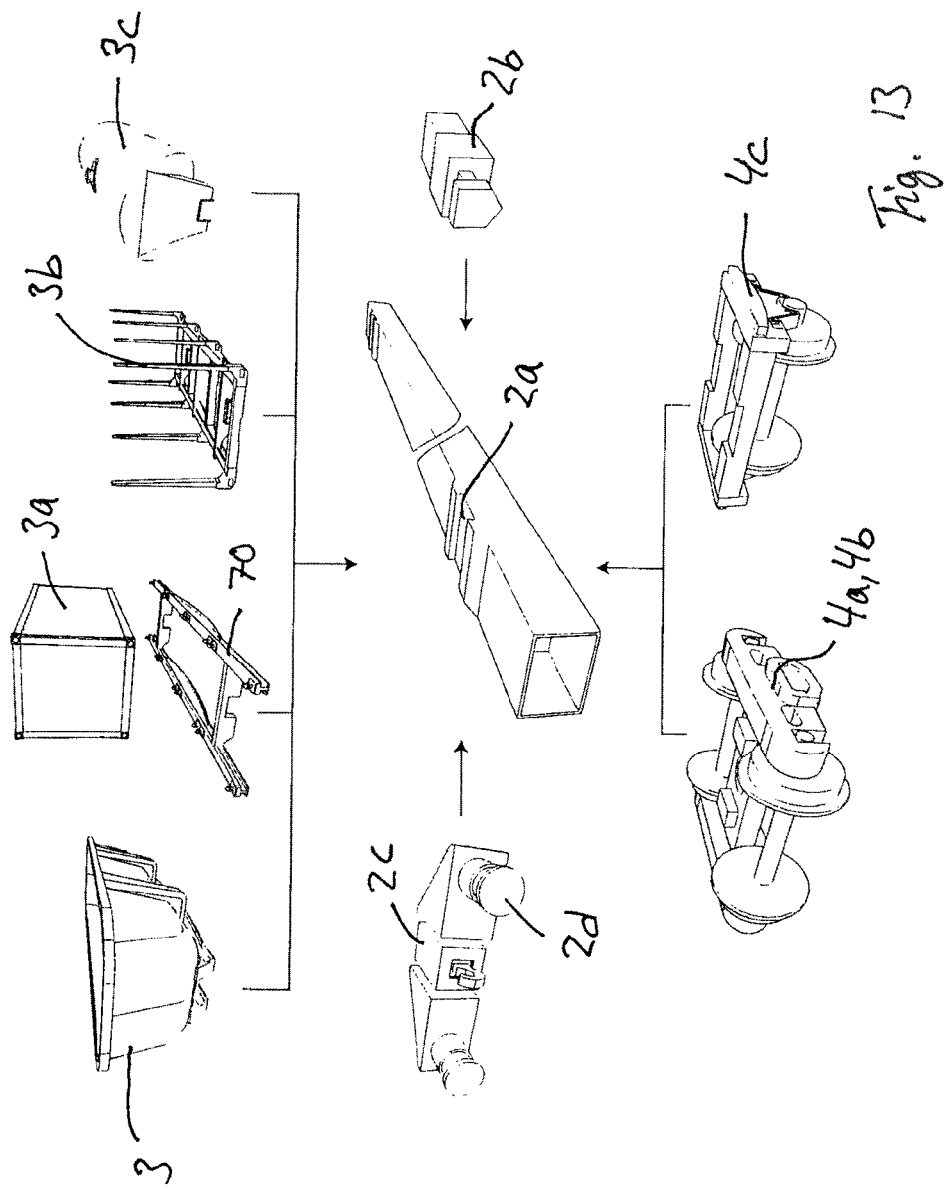

SYSTEM FOR TURNING A CARGO CARRIER AS WELL AS A TRANSPORT DEVICE PROVIDED WITH A LOOSE CARGO CARRIER

FIELD OF THE INVENTION

The invention relates to a system according to the preamble of claim 1 and a transport device according to the preamble of claim 7.

BACKGROUND OF THE INVENTION

What is desired from a logistics system is that it should have high efficiency, high flexibility, low acquisition cost, low operating costs as well as low environmental impact.

Rail transports are possibly comparatively environmental-friendly, but the other desires are not fulfilled other than possibly in particular transportation cases. Railway wagons are instead heavy, at the expense of the loading capacity, as well as expensive to purchase and operate.

It is also very expensive to build the railway itself, which makes that rail transports rarely can be made "from door to door". Therefore, transhipments are needed, which considerably increases the total transport time as well as the risk of problems. In addition, in transports between different countries, different track gauges sometimes occur, which also means transhipments.

Another major reason for the disadvantages of the railway is due to railway wagons being expensive to manufacture and type approve as well as being manufactured for a specific field of application for a very long service life, normally 30 years. This service life is so long that it is not possible to have a detailed knowledge about the transportation needs for such a long time ahead. Accordingly, acquisition of railway wagons involves a very high economic risk.

Therefore, railway wagons are often formed for as many fields of application as possible. This results in wagons in the end rarely being optimal for their purpose.

In many cases with special types of cargo, it is not even possible to consider rail transports, since there are no wagons for this type of cargo, and in many cases it is too expensive and time-consuming for each individual user to develop entirely new wagons from scratch for a specific need. In other cases, it may, e.g., not be possible to take advantage of the opportunity that a certain section of a line can manage a greater wagon weight, since this very type of wagon is maybe not available.

The long service life of the railway wagons, in combination with the same being subjected to fatigue load, implies that they have to be made very solid. This makes them heavy and thereby even more expensive.

Today, there are high-strength steels by means of which it would be potentially possible to lower the wagon weights. Unfortunately, the fatigue load has also the disadvantage that it is not possible to utilize the advantages of said steel grades.

In order to considerably improve the conditions for rail transports, it would be necessary to make it possible to simply alter railway wagons for different conditions and use, drastically decrease the need of transhipments as well as make them lighter and thereby more inexpensive by minimizing the parts subjected to fatigue load.

Transportation of bulk material involves particular challenges in that it is difficult to combine a railway wagon simple in the design, and thereby inexpensive and maintenance-friendly, with a cost-effective method of unloading the cargo.

A solution is to use bottom- or side-dumping wagons. However, this makes each wagon extra complicated with movable doors. If there are numerous wagons, this implies a considerable extra cost compared with wagons without doors. The doors also involve extra maintenance costs and the risk of the mechanisms jamming. In addition, each wagon becomes heavier at the expense of the loading capacity.

The most inexpensive way to transport bulk material on railway is to use the simplest possible wagon, in principle a box on wheels. This minimizes the cost of purchase and maintenance. The problem is that said wagons are difficult to discharge in a cost-effective way.

Today, there are in principle two ways to discharge such wagons. One is to use an excavator. This solution is, however, time-consuming and wears out the wagons. Another way is to use a so-called wagon tipper. Wagon tippers work in such a way that they discharge the wagons by revolving the entire wagon together with the part of the rail on which the wagon is standing. However, these machines are very expensive to purchase and maintain. In addition, each wagon has to be provided with expensive and delicate rotatable couplers. Such ones are not even approved in Europe. In addition, the solution has the disadvantage of it being dangerous to clean wagons having sticking cargo, since this is effected with the wagons upside-down. Particular, expensive machines are also required for the positioning of the train, since the locomotive cannot position the wagons in the unloading station with the precision required.

By U.S. Pat. No. 1,940,732, a railway wagon is known, the cargo carrier of which can be tilted sideward by means of a hydraulic cylinder, which is arranged to act on one long side of the cargo carrier. An axis of rotation, around which the cargo carrier is disposed to be tilted, is, however, positioned on the chassis of the railway wagon, which entails that the cargo body cannot be tilted at such a great angle as desirable, particularly in the case of sticking cargo.

By DE 1151219 B, a device is known for discharging a cargo carrier loosely carried on a railway wagon by rotating the same.

SUMMARY OF THE INVENTION

An object of the invention is to provide a simple and inexpensive system that enables unloading of a cargo carrier as well as a simple and inexpensive transport device comprising the cargo carrier.

Furthermore, the cargo carrier should be possible to be turned/tilted more or less up and down, i.e., approx. 180°, particularly for the unloading of sticking cargo being difficult to discharge.

Furthermore, in the unloading station, it should be possible to assist in unloading the cargo by means of, e.g., wheel-loaders.

Furthermore, it should be possible to exchange the cargo carrier carried on the chassis depending on what cargo to be transported as well as to alter the length of the chassis.

Furthermore, it should be possible to exchange the bogie.

Furthermore, it should be possible to change to different couplers of the transport device.

This object is achieved by a system for turning a cargo carrier arranged on a transport device with the purpose of discharging the carrier of cargo, which system comprises:

a transport device having a chassis, a cargo carrier that is loosely carried on the chassis and externally provided with engagement points at a first and a second opposite side, a first turning device disposed to engage with the engagement points of the cargo carrier at the first side as well as to actuate the cargo carrier for the turning of the same, a second turning device disposed to engage with the engagement points of the cargo carrier at the second side and disposed to act as a carrier of the cargo carrier during the turning of the same, members for the control and actuation of at least the first device, and members for the correct positioning of the engagement points of the cargo carrier in relation to the first and the second turning device, the cargo carrier being—upon actuation of the first turning device, in the engagement position thereof with the engagement points arranged on the first side of the cargo carrier—disposed to be turned around an axis of rotation formed by the second turning device and the engagement points arranged on one side of the cargo carrier, and the characteristic of the invention being that the engagement points are identical and symmetrically placed in relation to the first and the second side of the cargo carrier in order to allow direction-independent placement of the cargo carrier on the chassis.

This object is also achieved by a transport device comprising a chassis in the form of a bar, which is connected to and carried in at least one point of the respective bogie and arranged to absorb tractive and thrust forces, and a cargo carrier, which cargo carrier is loosely carried on the chassis, and the characteristic of the transport device being that the cargo carrier is provided with a frame structure comprising at least two bottom beams and at least one cross beam at the respective bogie for the transfer of the weight of the cargo carrier to right above at least one supporting point arranged at the respective bogie, that the bottom beams are placed on each side of the chassis, when the frame structure rests against the chassis, that the bottom beams are provided with support members arranged to rest against complementary support members placed approximately right above the respective supporting point, and that the chassis is provided with longitudinal stops to prevent the displacement of the cargo carrier in the longitudinal direction of the transport device.

Preferred embodiments are defined in the dependent claims.

BRIEF DESCRIPTION OF THE DRAWINGS

The invention is described in more detail below, reference being made to the appended drawings, in which FIG. 13 illustrates a schematic view of possible combinations that can be built by means of a transport wagon comprising a central drawbar.

DESCRIPTION OF PREFERRED EMBODIMENTS

Figure 1:
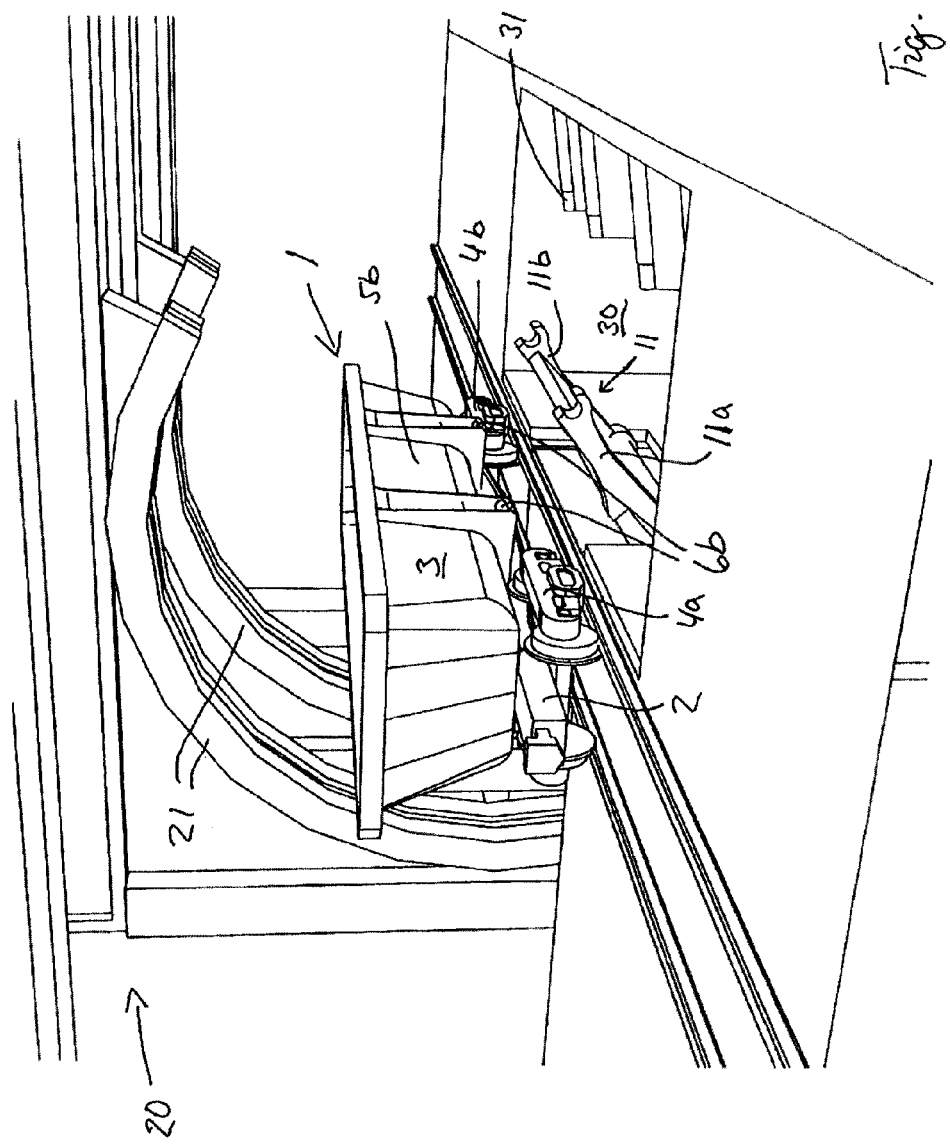
FIG. 1 is a schematic view of a system according to the invention comprising an unloading station and a transport device, preferably a railway wagon for ore transport, the cargo carrier of which is turnable by means of turning devices arranged in the unloading station.

In the description and claims below, the expression bogie is used, but it is evident to a person skilled in the art that the bogie may be replaced by a pair of wheels.

As has been indicated above, the object of the invention is to provide a simple and inexpensive system that enables unloading of a cargo carrier as well as a simple and inexpensive transport device comprising the cargo carrier.

The transport device/wagon should in principle handle two great forces, one is the train forces, i.e., tractive and thrust forces, and the other is to carry the cargo. Therefore, in the transport device according to the invention, these two forces have been divided into two separate components—drawbar and a self-supporting cargo carrier, respectively. The weight of the cargo carrier is transferred down to the wheels via the drawbar on points straight above the points where this has support from the wheels. In such a way, the weight from the cargo carrier travels the shortest possible way through the drawbar and without bending loading the same. In principle, it is enough with stiffening bulkheads in the drawbar to manage this. In order to bring down the total height of the wagon, the structural elements of the cargo carrier may be formed as two beams that are placed on each side of the drawbar.

For the sake of the balance, the cargo carrier will moreover either rest against, or if required, be restable against lateral supports of the bogie/wheels.

In principle, the cargo carrier is standing entirely loosely on the underframe, but may if required be locked to the same. In order to prevent undesired displacement in the longitudinal direction, longitudinal stops $2a$, e.g., in the form of shoulders on the drawbar, may be arranged, see FIG. 13. This longitudinal stop may co-operate with, e.g., a suitably placed cross beam underneath the cargo carrier. Undesired lateral sliding movements are prevented in a corresponding way.

By the fact that the two different main forces are carried by separate construction parts, it is simpler to optimize the design of these for their respective load cases, as compared with if they had been integrated with each other. The parts may also be given a less complex design, which strongly facilitates calculation of strength and manufacture. In such a way, they can be made exactly sufficiently strong to carry the requisite forces.

By the cargo carrier in principle being removable and self-supporting, this can be lifted off from the wagon. This affords very great advantages. For instance, it is possible to choose to form the cargo carrier for shorter service life than the underframe. This makes that the cargo carrier can be made lighter, which allows conveying more cargos in each transportation and in such a way recovering the possible extra cost that arises because of the need of replacing the cargo carrier more often than if it had a longer service life.

Furthermore, it is possible to damp the cargo carrier from fatiguing vibrations in the underframe. This means that it is only the wheels including peripheral equipment and the minimal drawbar that will be subjected to fatigue load, while a great part of the wagon—the cargo carrier—will not be. Thereby, the cargo carrier can be allowed to be subjected to a load that is several times greater and can therefore be made additionally considerably much lighter.

For the same reason, it is possible to use and benefit fully from the advantages of the strength of the high-strength steel grades of the cargo carrier. Thereby, this can for a further reason be made much lighter.

A non-limiting example of a transport device/wagon 1 is shown in FIGS. 1-6, wherein it is seen that the same comprises a chassis 2 intended primarily for absorbing tractive and thrust forces, which chassis is connected to and carried in at least one point of the respective bogie 4a, 4b at the respective end of the chassis, and a cargo carrier 3. In the embodiment illustrated, the chassis comprises an elongate drawbar 2. The cargo carrier 3 is provided with a frame structure, which may embrace mutually interconnected bottom beams 50, side beams 53 and a load-bearing top beam 54 (FIG. 6), intended to carry the weight of the cargo carrier and the cargo carried by the cargo carrier and to transfer the same to right above the respective bogie. The bottom beams 50 are placed on each side of the drawbar 2 and are provided with support members 51 intended to rest against complementary support members 52 placed approximately at the middle of the respective bogie 4a, 4b. Around its upper circumference edge, the cargo carrier is fitted with the load-bearing top beam 54. Preferably, the engagement points 6a, 6b are connected with the side beams 53.

Figure 9:
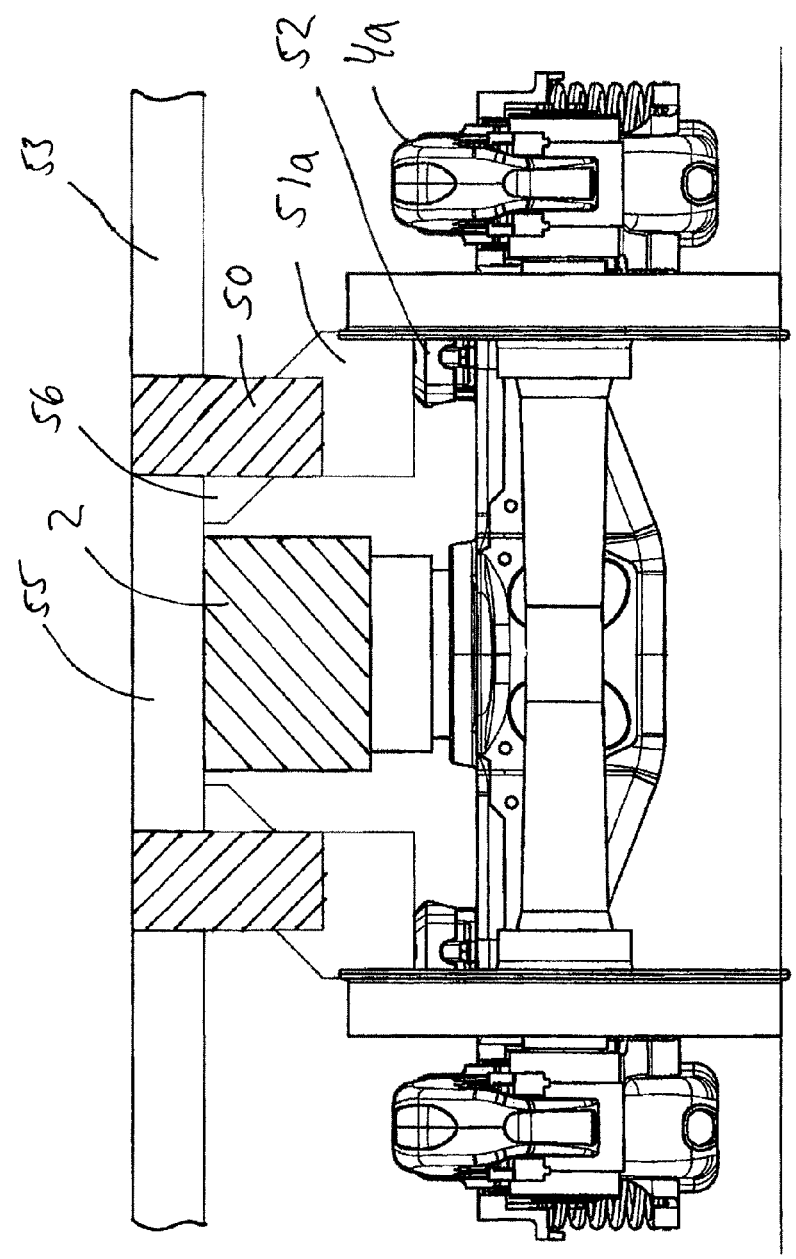
FIG. 9 is a schematic sectioned end view of a bogie having a schematically shown carried bottom of a cargo carrier.

In FIG. 9, there is a schematic sectioned end view of a bogie having a schematically shown cross beam 55. The side beams 53 and the cross beam 55 are preferably mutually displaced in the longitudinal direction of the wagon. In this embodiment, the bottom beams 50 are provided with lateral supports 51a that rest against support members 52, which extend in line with and are placed between the pairs of wheels of the bogie 4a. This in contrast to FIG. 6, in which case the support member 52 is placed inside the line of the pair of wheels. Furthermore, on their side facing the drawbar 2, the bottom beams 55 are provided with guide members 56 to guide the cargo carrier 3, when it is placed on the wagon underframe/drawbar. These guide members 56 also prevent the displacement of the cargo carrier laterally.

By forming the wagon 1 in the way mentioned above, it is possible to utilize the top beam 54 to lift the cargo carrier in a simple way between different wagon underframes, as in the case of railway wagons that may have different track gauges, or from railway to lorry/truck/semitrailer/dumper or vice versa.

By forming the wagon 1 in this way, differently long cargo carriers can be placed on the chassis, which in such a case has a length adapted to the cargo carrier, as long as the engagement points 6a, 6b correspond with the first 10 and second 11 turning device.

In the embodiments shown, the arms 11a, 11b of the second turning device 11 are shown swivellable between an active and an inactive position, but it is evident that the arms 11a, 11b can make a vertical movement between an active and inactive position or be stationary placed in the active position.

It is evident to a person skilled in the art that by the cargo carrier being loosely arranged on the underframe, the same can be moved between different trains/transport types or underframes having different track gauges. The lifting operations may, e.g., be effected by means of container trucks, terminal cranes or straddle trucks. This allows avoiding a great deal of transhipments of cargo. Take as an example a company, a mine or maybe a forest that is felled and that is situated at a distance from a railway. It is then possible to load into cargo carriers that are transported by lorries/trucks to the nearest railway terminal. There, the cargo carriers can then be transshipped to trains.

An advantage of the cargo carrier being fitted with the bottom beams 51 is that they can act as supports, when the cargo carrier is placed on the ground or some other substratum. This allows the loose cargo carrier, standing on the ground, to be preloaded, be used as a store and, when an opportunity arises, be lifted up on a vehicle/train or the like for transportation. In such a way, it is avoided to have, e.g., an entire train or a lorry/truck waiting during the loading. In unloading, it is possible to utilize the advantage of being able to exchange the loaded cargo carrier for an empty one and in such a way keep the vehicles occupied more efficiently.

Above, there has been described an example of a cargo carrier for bulk cargo, but, as seen in FIG. 13, it is possible to utilize different types of cargo carriers intended for transportation of, e.g., lumber 3b, liquid 3c, etc. It is also possible to place a frame 70 on the drawbar/bogies for allowing transportation of containers 3a, wherein the frame essentially has the same size as the bottom of the container. In such a way, it is possible to easily transform one's wagons according to the current transport need at each instant of time by having several different types of cargo carriers for each underframe. In other embodiments of the transport device, e.g., the proper wagon chassis/drawbar may also be modified. More precisely, it can be exchanged to adapt the length and the strength according to needs. It is also possible to have a group of frames intended for bottom-dump cargo carriers. Also the wheels can be exchanged between different types. In certain cases, it is desired to have single-axle wagons 4c and other times wagons with bogie 4a, 4b. These may in turn be made for different axle loads.

When a type of underframe has been approved with a certain cargo carrier, only relatively simple simulations are required to get the same underframe approved for another cargo carrier. Since the cargo carrier is considerably more inexpensive than the underframe, it is possible to develop new cargo carriers according to needs at relatively low costs.

In FIG. 13, it is further seen that also the couplers 2b, 2c at the ends of the drawbar can be exchanged. It is possible to change between, e.g., usual standard couplers 2c and central couplers 2b. If, e.g., a mine is opened and has small transport needs to start with, it is possible to have wagons with ordinary couplers. It is then possible to send one's wagons in system trains with wagons from different wagon owners. When the capacity requirement increases and one gets longer and heavier trains, it may be needed to switch to automatic couplers/central couplers 2b. Furthermore, in the case of standard couplers 2c, the ends of the drawbar may be fitted with dead blocks 2d.

It is evident to a person skilled in the art that, in case required by national legislation or other rules, or that needs exist, the cargo carrier can be fixedly connected with the wagon underframe/drawbar.

Figure 2:
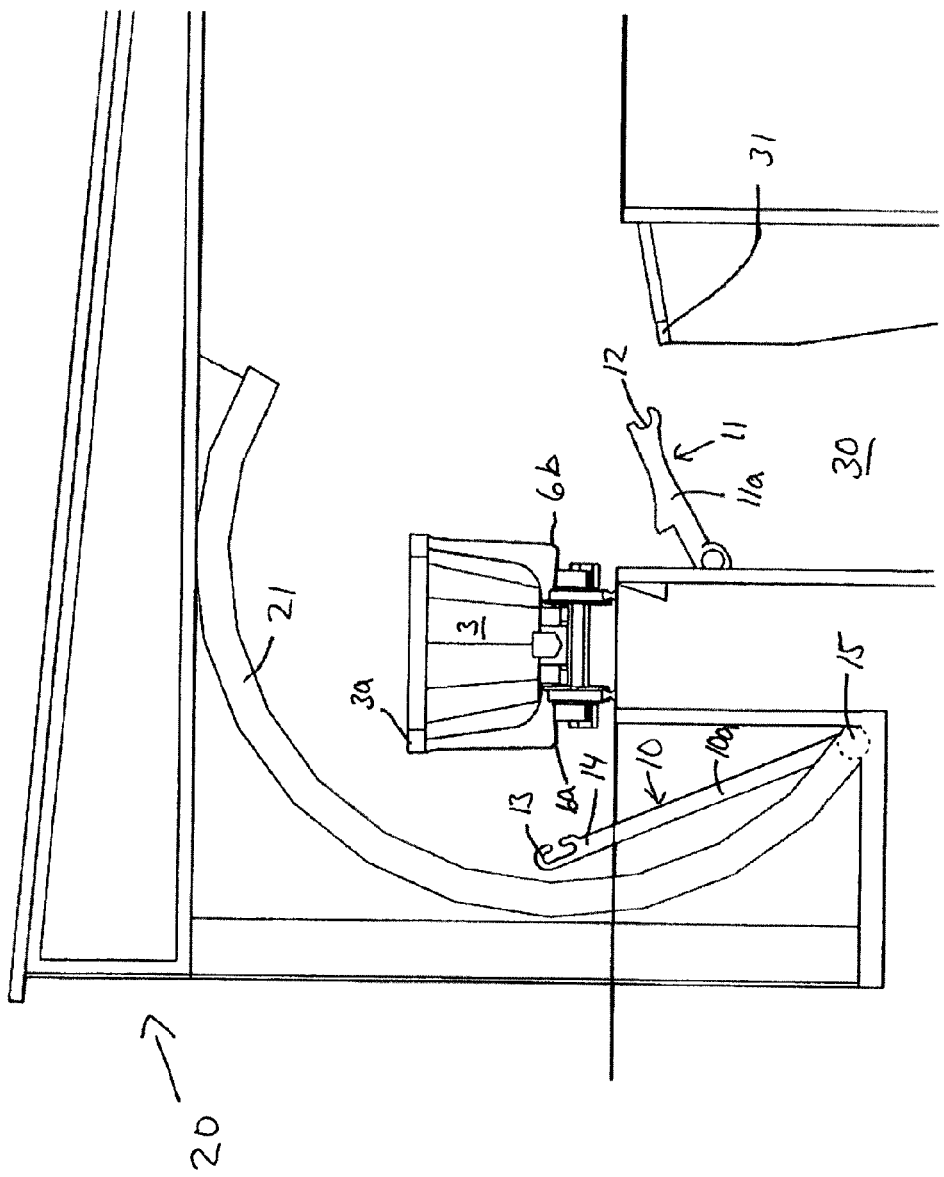
FIG. 2 is a schematic side view of the system in FIG. 1.

In FIGS. 1 and 2, it is seen that the system comprises a transport device 1, in the shown case a railway wagon, comprising a chassis or a wagon underframe in the form of an elongate bar 2 that, at each end, is carried by a bogie 4a, 4b. A cargo carrier 3 is loosely carried on the chassis. Externally at a first side 5a and a second opposite side 5b, the cargo carrier is provided with engagement points 6a, 6b. These engagement points are identical and symmetrically placed in relation to the first and the second side 5a, 5b of the cargo carrier 3. Preferably, the engagement points are placed under the level of the bottom of the cargo carrier 3.

Furthermore, the system comprises a first turning device 10 disposed to engage with the engagement points 6a of the cargo carrier at the first side 5a as well as to actuate the cargo carrier for the turning of the same by the first device lifting the first side of the cargo carrier. In the lifting of the first side 5a of the cargo carrier 3, a second turning device 11 is disposed to engage with the engagement points 6b of the cargo carrier at the second side 5b and to act as a load bearer of the cargo carrier. More precisely, in a preferred embodiment, the lifting of the first side brings the second side of the cargo carrier to "make a curtsey", the engagement points 6b on the second side of the cargo carrier being displaced vertically downward and will then come into abutment in bearing members 12 of the second turning device 11, which bearing members 12 co-operate in this position with the engagement points 6b for the formation of an axis of rotation A-A, as will be described in more detail below, reference being made to FIG. 6.

By the cargo carrier being loosely carried on the wagon underframe, it can in a simple way be moved/lifted between different wagon underframes having, e.g., different track gauges, or from railway to lorry/truck/semitrailer/dumper or vice versa.

In FIG. 1, an unloading station is schematically shown in which the transport device 1 is intended to be turned. The unloading station comprises a schematically shown building 20 that is provided with guides 21 for the guiding and transfer of the first turning device 10. Furthermore, a discharging pocket 30 is arranged under and displaced laterally in relation to the transport device 1. In the discharging pocket 30, a plurality of stopper members 31 are arranged, against which an upper edge 3a of the cargo carrier 3 is intended to abut in the completely turned-over state of the cargo carrier, see FIG. 5.

The stopper members may possibly be formed to absorb the bounce, when the turning of the cargo carrier is stopped, instead of this load being carried by the cargo carrier and the first turning device. This leads to a shock being obtained that assists in the discharging without for that reason the cargo carrier and the first turning device having to be redimensioned for this extreme load that may arise when, in the worst case, the entire mass of cargo remains in the cargo carrier in this position. This may occur either by the fact that the cargo is very sticky or that it is frozen fast.

In the embodiment illustrated, the first turning device 10 comprises two arms 10a, 10b one of which is shown in FIG. 2. The second turning device 11 correspondingly comprises two arms 11a, 11b. In a preferred embodiment, the engagement points 6a, 6b arranged on the outside of the cargo carrier are formed in the same way and placed in the same position on both sides of the cargo carrier. This implies that the placement of the cargo carrier on the chassis becomes direction-independent.

It is evident that the first and the second turning device may comprise more than two arms. Possibly, the first turning device may comprise only one arm.

The advantages of one or more arms of the first turning device are that the axle in the contact of the arm/arms with the semicircular guide/guides and the axle in the engagement of the arm/arms with the cargo carrier make that the guide/guides does/do not need to be exactly circular in relation to the turning point. This is so since the angle of the arm/arms can be allowed to vary in relation to the cargo carrier as well as to the guide/guides. Thus, the distance to the turning point does not become as critical, and it is even possible to conceive a guide/guides having a polygon shape. This also implies lower requirements on the precision in the manufacture of the transport device and the positioning of the same in the unloading station.

Figure 10:
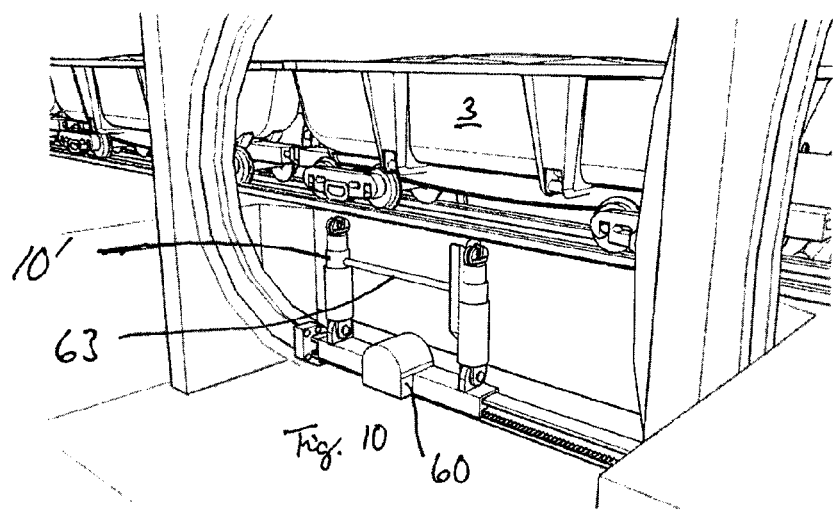
FIGS. 10-12 illustrate adaptation of the turning device for the cargo carrier to the position of the wagon in the unloading station.
Figure 11:
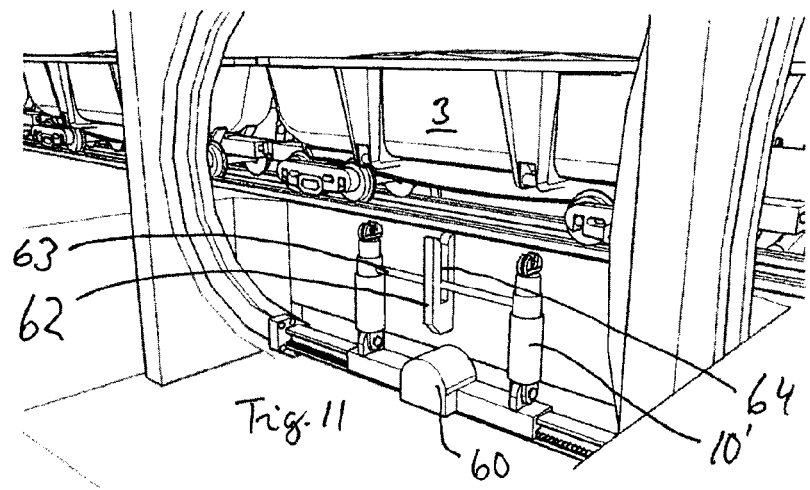
Figure 12:
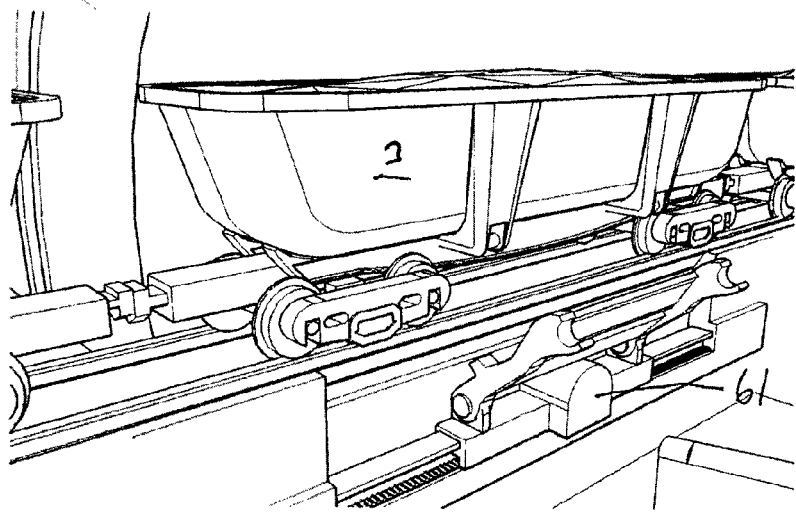

Furthermore, the unloading station 20 comprises members, not shown, for the control and actuation of the first 10 and the second 11 turning device, as well as members 60, 61 for the correct positioning of the engagement points 6a, 6b of the cargo carrier 3 in relation to the first and the second turning device, see FIGS. 10-12. More precisely, the first and second turning device 10, 11 of the unloading station 20 may be disposed to be displaced synchronously in the longitudinal direction of the wagon in order to, in such a way, enable alignment of the first and second turning device 10, 11 in relation to the engagement points 6a, 6b of the cargo carrier. This is so because it is not possible to position railway wagons particularly accurately by means of the locomotive in the longitudinal direction, approx. ±2 m.

Figure 3:
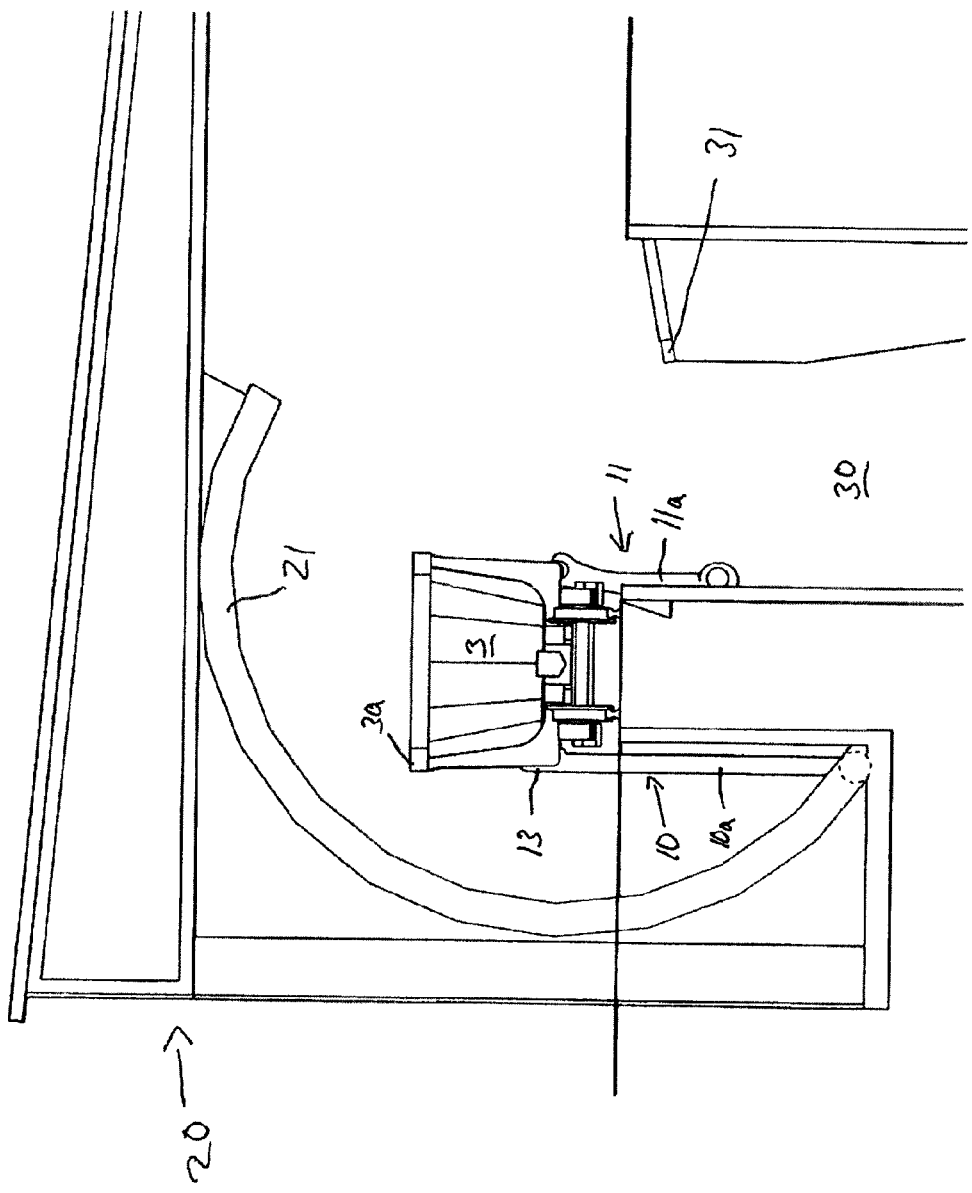
FIG. 3 is a schematic side view of the system in FIG. 2 just before the turning of the cargo carrier has commenced.
Figure 4:
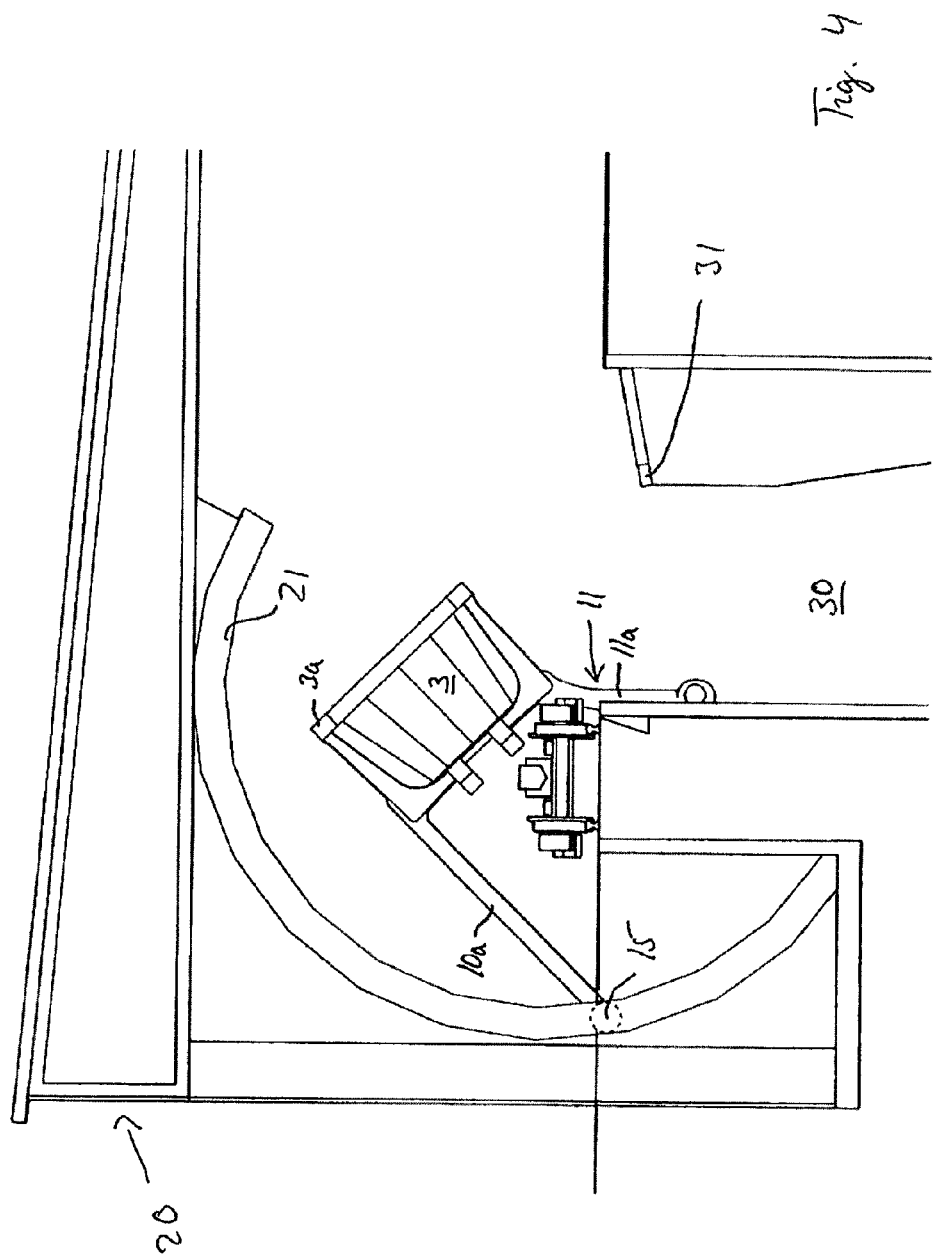
FIG. 4 is a schematic side view of the system in FIG. 2 wherein the cargo carrier has been lifted somewhat from the chassis.
Figure 5:
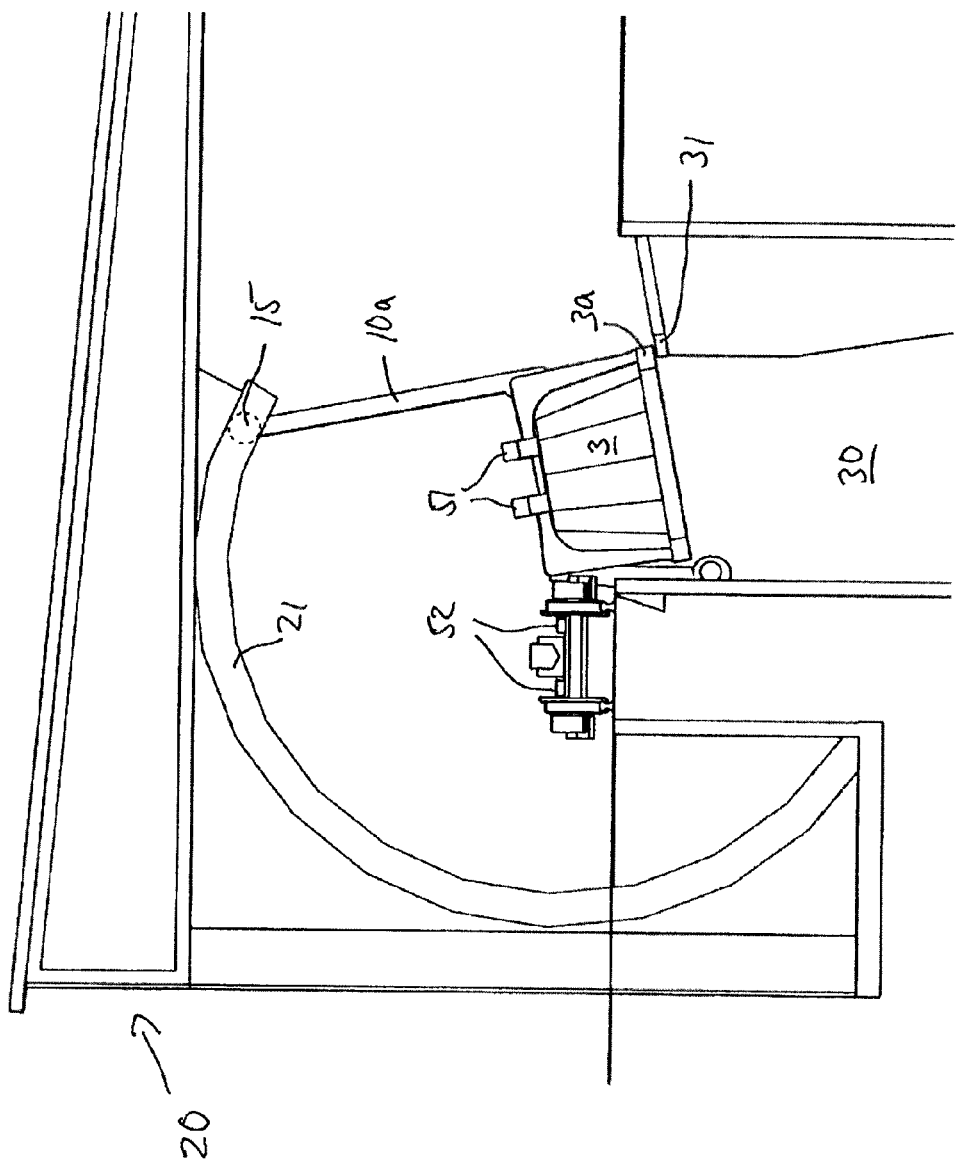
FIG. 5 is a schematic side view of the system in FIG. 2 wherein the cargo carrier has been maximally turned.

FIGS. 2-5 show successive side views of the turning of a cargo carrier 3. More precisely, FIG. 2 shows the initial position of the turning of the cargo carrier, the engagement points 6a, 6b of the cargo carrier 3 having been aligned in relation to the first and the second turning device, and the arms of the respective turning device 10, 11 are in an inactive position, starting position. In FIG. 3, the arms of the respective turning device 10, 11 have been raised up to their active position, a gripping member/open loop 13, which is arranged at a first end 14 of the respective arm 10a, 10b, having been brought into engagement with the respective engagement point 6a. In this position, the bearing members 12 of the respective arms 11a, 11b have not become engaged with the respective engagement point 6b. In FIG. 4, a second end 15 of the respective arm 10a, 10b has been transferred a distance along the guides 21. This transfer may be effected by means of, e.g., wires, chains, co-operating racks and pinions, not shown, or any other suitable devices in combination with return wheels where needed. The guides 21 are preferably semicircular arch-shaped. This transfer of the second end 15 of the arms causes the engagement points 6b arranged on the opposite side of the cargo carrier to engage with the bearing members 12 of the arms 11a, 11b, the bearing members and the engagement points 6b forming an axis of rotation A-A around which the cargo carrier can be turned/tilted. In this position, the cargo carrier is completely lifted from the chassis. In FIG. 5, a position is shown in which the cargo carrier 3 has been maximally turned, and the edge 3a of the cargo carrier abuts against the stopper members 31. Furthermore, it is seen that the axis of rotation A-A is detached from the wagon underframe.

In one embodiment (not shown), the second turning device 11 is disposed to first engage with the engagement points 6b after which the first turning device 10 is disposed to engage with the engagement points 6a.

In a position (not shown), where the bottom of the cargo carrier is directed approximately vertically and when the cargo consists of sticky material, e.g., a wheel-loader (not shown), may assist in unloading the cargo by scraping out the same. It is also possible to unload the cargo in this position by means of flushing, a cleaning robot or by hand.

Figure 6:
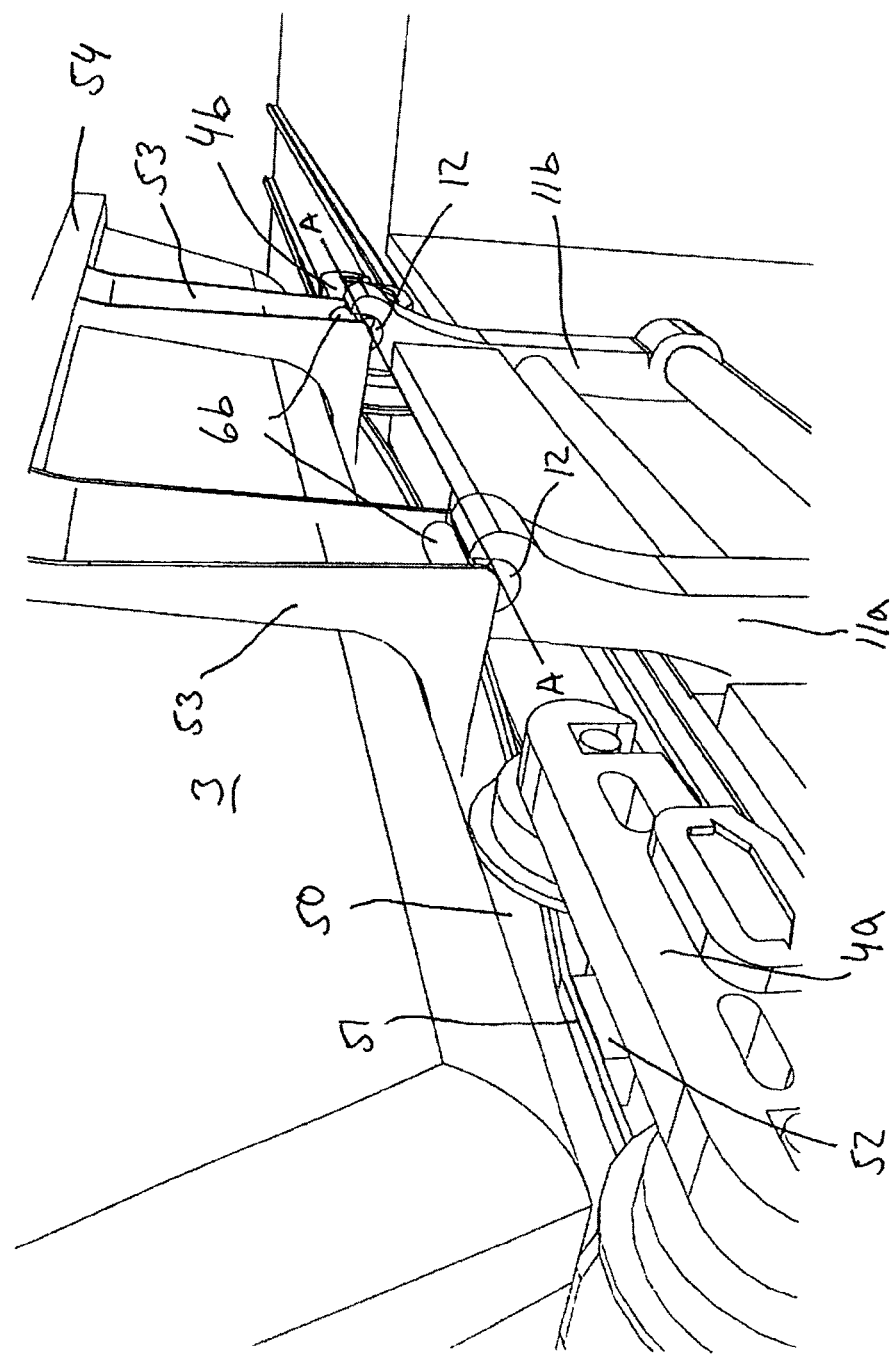
FIG. 6 is an enlarged partial view of a part of a device for the turning of the cargo carrier.

In FIG. 6, an enlarged partial view is shown of the position of the arms 11a, 11b in FIG. 3. In this position, the arms 11a, 11b have been raised up to their active position by actuation members, not shown, in which position the bearing members 12 of the arms are aligned with and arranged to co-operate with the engagement points 6b. In engagement between the engagement points and the bearing members, an axis of rotation A-A is formed, around which the cargo carrier can be turned/tilted, the arms acting as load bearers of the cargo carrier when the same is turned.

By placing the axis of rotation detached from the chassis of the wagon at the same time as it acts as a load bearer of the cargo carrier, it becomes possible to turn/tilt the cargo carrier more or less upside-down. Neither there is any stability problem of the chassis/wagon underframe in the turning of the cargo carrier.

An additional advantage of placing the axis of rotation detached from the chassis of the wagon is that the total weight of the wagon is reduced. According to the invention, "the load-bearing hinge" is integrated in the unloading station and not in the wagon, and more precisely in the form of the second turning device in combination with the engagement points 6b. Furthermore, "the load-bearing hinge" should be placed on a level with or below the level of the bottom of the cargo carrier.

By placing the engagement points 6a, 6b at the lower edge of the cargo carrier, only the bottom structure of the cargo carrier, together with the engagement points, needs to be made robust. Furthermore, the proper cargo carrier is not subjected to any transverse loads, and therefore the cargo carrier does not need to be stiffened, and a possible top beam and side beams can be made relatively weak. This entails that the cargo carrier can be made lighter and thereby take more cargo.

Figure 7:
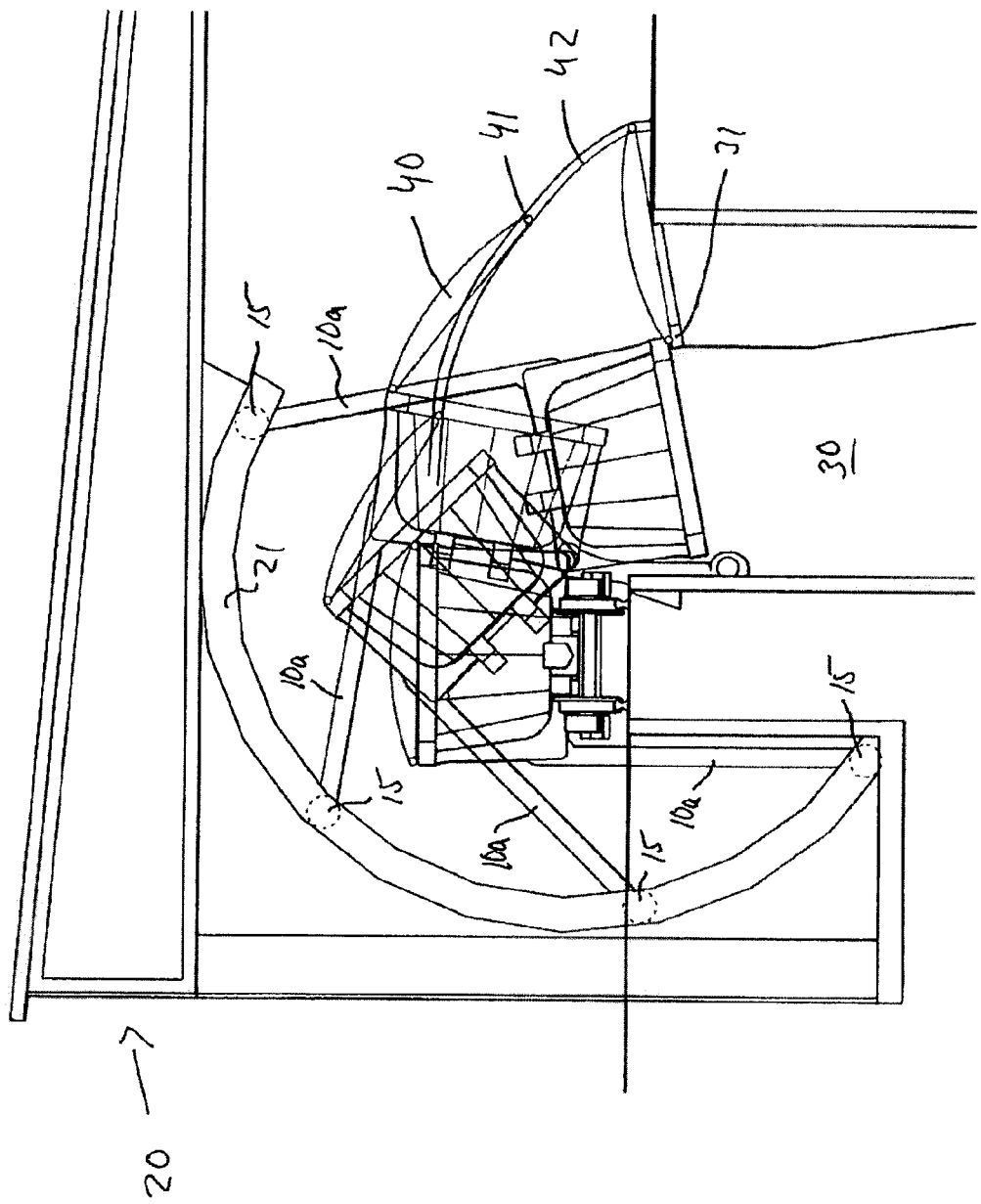
FIG. 7 shows in side view superimposed figures of turning stages of the cargo carrier, the cargo carrier being provided with an openable cover.

FIG. 7 shows in side view superimposed figures of turning stages for an embodiment of the cargo carrier 3 provided with an openable cover 40. At its end edges, the cover 40 is provided with suitable members 41, such as pins, that are disposed to engage with suitable grooves 42 for automatic opening of the cover when the cargo carrier is turned.

Figure 8:
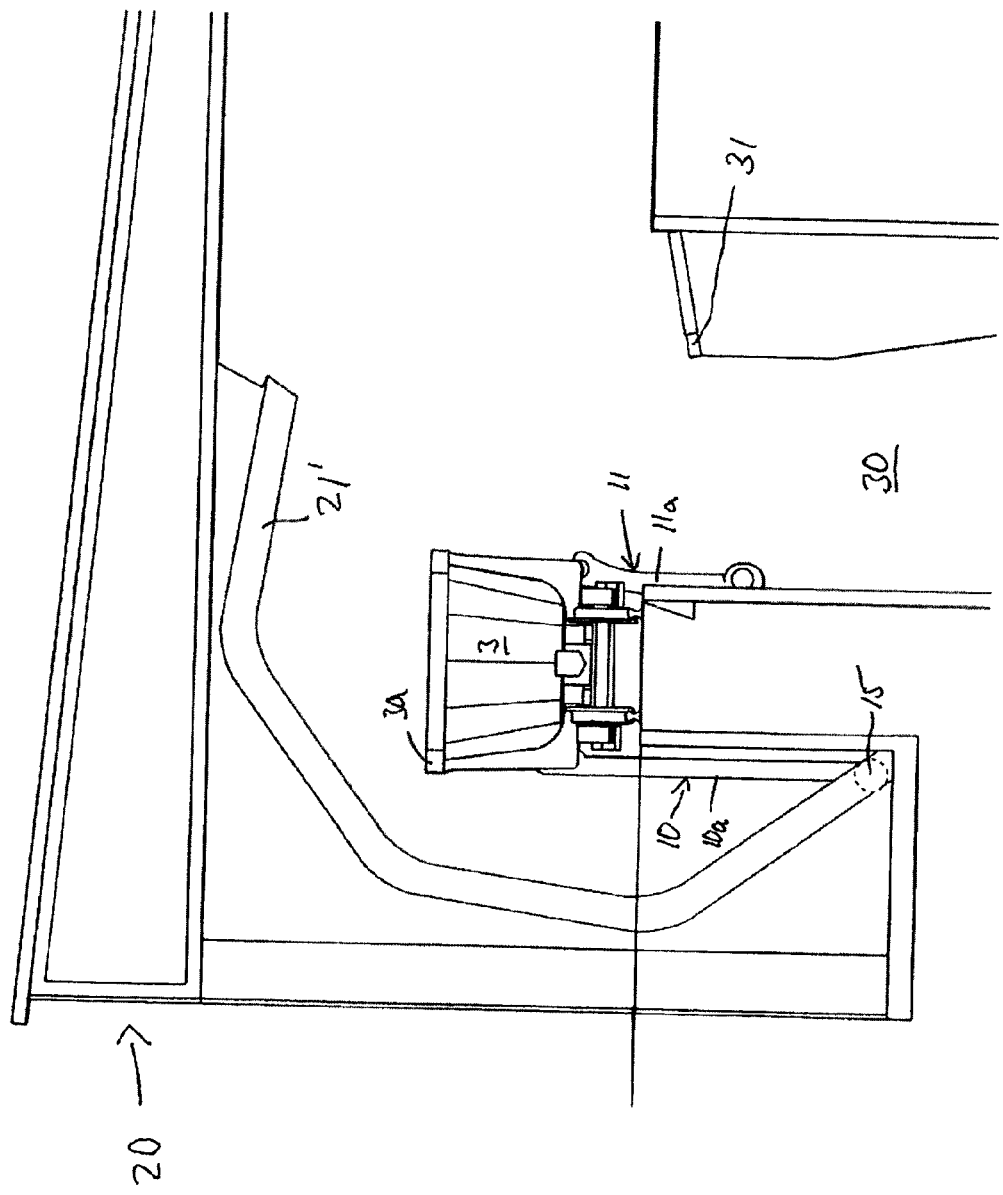
FIG. 8 is a schematic view similar to the one in FIG. 3, but with a modified embodiment of the turning device.

In FIG. 8, the circular arc-shaped guides 12' are shown made of longer straight portions. This is in order to simplify the manufacture of the same.

In FIGS. 10 and 11, the first turning device 11 is shown in the form of telescoping arms 10'. In order to align the arms 10' in the vertical direction toward the engagement points, a guide device 62 is arranged. More precisely, a stay 63 arranged between the arms 10' is disposed to be guided by a notch 64 in the guide member until the gripping member 13 of the arms 10' is in contact with the engagement points.

In one embodiment (not shown), the guides may be formed of two straight portions that may be interconnected by a rounded transition. More precisely, the respective arm 10a, 10b has a second end 15 disposed to make at least two essentially linear movements during the turning of the cargo carrier.

In a further embodiment (not shown), the guides may have a straight portion in the beginning of the transfer of the arms 10, 10' in the vertical direction, i.e., the guides are in the form of a question-mark, "?".

The invention claimed is:

1. A system for turning a cargo carrier arranged on a transport device with the purpose of discharging the cargo carrier, the system comprising:
   the transport device having a chassis;
   a cargo carrier that is loosely carried on the chassis and externally provided with engagement points at a bottom of the cargo carrier at a first side and an opposite second side relative to the first side;
   a first turning device disposed to engage with the engagement points of the cargo carrier at the first side as well as to actuate the cargo carrier for a turning of the cargo carrier;
   a second turning device disposed to engage with the engagement points of the cargo carrier at the second side and disposed to provide a load bearing support for the cargo carrier as it rotates around an axis extending through the engagement points of the cargo carrier at the second side, the engagement points being identical and symmetrically placed in relation to the first side and the second side of the cargo carrier in order to allow direction-independent placement of the cargo carrier on the chassis; and
   members for the control and actuation of at least the first turning device, wherein, upon actuation of the first turning device, the cargo carrier is in an engagement position thereof with the engagement points arranged on the first side of the cargo carrier and disposed to be turned around an axis of rotation formed by the second turning device and the engagement points arranged on the second side of the cargo carrier, wherein the first turning device and the second turning device are disposed to be displaced synchronously in the longitudinal direction of the cargo carrier in order to enable alignment of the first turning device and the second turning device in relation to the engagement points of the cargo carrier such that the cargo carrier is lifted completely off the chassis and inverted by the first turning device and the second turning device.

2. The system according to claim 1, further comprising members for the correct positioning of the engagement points of the cargo carrier in relation to the first turning device and the second turning device.

3. The system according to claim 1, wherein the engagement points are placed on a level with or below the level of the bottom of the cargo carrier.

4. The system according to claim 1, wherein the first turning device comprises two parallel and synchronously transferable arms, wherein each of the two arms has a second end disposed to controllably be transferred in a guide by wires, chains, or co-operating racks and pinions in such a way that the second end performs at least two essentially linear movements during the turning of the cargo carrier, and wherein each of the two arms has a first end provided with a gripping member intended to engage with the associated engagement point of the cargo carrier during the transfer of the arm.

5. The system according to claim 3, wherein the first turning device comprises two parallel and synchronously transferable arms, wherein each of the two arms has a second end disposed to controllably be transferred in a guide by wires, chains, or co-operating racks and pinions in such a way that the second end performs at least two essentially linear movements during the turning of the cargo carrier, and wherein each of the two arms has a first end provided with a gripping member intended to engage with the associated engagement point of the cargo carrier during the transfer of the arm.

6. The system according to claim 1, wherein the first turning device comprises two parallel and synchronously transferable arms, wherein each of the two arms has a second end disposed to controllably be transferred in a guide by wires, chains, or co-operating racks and pinions in such a way that the second end performs at least two essentially linear movements during the turning of the cargo carrier, and wherein each of the two arms has a first end provided with a gripping member intended to engage with the associated engagement point of the cargo carrier during the transfer of the arm.

7. The system according to claim 1, wherein the transport device is a railway wagon.

8. The system according to claim 2, wherein the engagement points are placed on a level with or below the level of the bottom of the cargo carrier.

9. The system according to claim 8, wherein the first turning device comprises two parallel and synchronously transferable arms, wherein each of the two arms has a second end disposed to controllably be transferred in a guide by wires, chains, or co-operating racks and pinions in such a way that the second end performs at least two essentially linear movements during the turning of the cargo carrier, and wherein each of the two arms has a first end provided with a gripping member intended to engage with the associated engagement point of the cargo carrier during the transfer of the arm.

10. A system for turning a cargo carrier arranged on a transport device with the purpose of discharging the cargo carrier, the system comprising:
   the transport device having a chassis;
   a cargo carrier that is loosely carried on the chassis and externally provided with engagement points located at a bottom of the cargo carrier at a first side and an opposite second side relative to the first side;
   a first turning device disposed to engage with the engagement points of the cargo carrier at the first side underneath the cargo carrier as well as to actuate the cargo carrier for the turning of the cargo carrier;
   a second turning device disposed to engage with the engagement points of the cargo carrier at the second side underneath the cargo carrier and disposed to act as a carrier of the cargo carrier in the turning of the cargo carrier, the engagement points being identical and symmetrically placed in relation to the first side and the second side of the cargo carrier in order to allow direction-independent placement of the cargo carrier on the chassis; and
   members for the control and actuation of at least the first turning device, wherein, upon actuation of the first turning device, the cargo carrier is in an engagement position thereof with the engagement points arranged on the first side of the cargo carrier and disposed to be turned around an axis of rotation formed by the second turning device and the engagement points arranged on the second side of the cargo carrier, wherein the first turning device and the second turning device are disposed to be displaced synchronously in the longitudinal direction of the cargo carrier in order to enable alignment of the first turning device and the second turning device in relation to the engagement points of the cargo carrier such that the cargo carrier is lifted completely off the chassis and inverted by the first turning device and the second turning device.

11. The system according to claim 10, wherein the second turning device provides a load bearing support for the cargo carrier as it rotates around an axis extending through the engagement points of the cargo carrier at the second side.

12. The system according to claim 10, wherein the first turning device comprises two parallel and synchronously transferable arms, each of the two arms comprising:
   a first end provided with a gripping member that engages with an associated one of the engagement points at the first side upon actuation for a turning of the cargo carrier during a transfer; and
   a second end controllably transferred in a guide by wires, chains, or co-operating racks and pinions such that the second end performs at least two essentially linear movements during the turning of the cargo carrier.

* * * * *